(12) United States Patent
Masuda et al.

(10) Patent No.: US 8,723,404 B2
(45) Date of Patent: May 13, 2014

(54) LIGHT-DIFFUSING HEAT SHRINKABLE TUBE AND LINEAR LED LIGHT

(75) Inventors: Masakazu Masuda, Isehara (JP); Ichiro Arai, Isehara (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 13/819,608

(22) PCT Filed: Feb. 17, 2012

(86) PCT No.: PCT/JP2012/053774
§ 371 (c)(1),
(2), (4) Date: Apr. 30, 2013

(87) PCT Pub. No.: WO2012/114991
PCT Pub. Date: Aug. 30, 2012

(65) Prior Publication Data
US 2013/0207534 A1  Aug. 15, 2013

(30) Foreign Application Priority Data
Feb. 21, 2011  (JP) .................................. 2011-034110

(51) Int. Cl.
*H01J 5/16* (2006.01)
(52) U.S. Cl.
USPC .......................................... 313/116; 362/488
(58) Field of Classification Search
USPC ................. 362/488, 545, 287, 800, 249, 471; 313/116
See application file for complete search history.

(56) References Cited

U.S. PATENT DOCUMENTS

| | | | | |
|---|---|---|---|---|
| 6,158,882 A * | 12/2000 | Bischoff, Jr. | .................. | 362/488 |
| 6,945,669 B1 * | 9/2005 | Jester | ............................ | 362/227 |
| 2002/0097195 A1 * | 7/2002 | Frank | ................................ | 345/5 |
| 2003/0193803 A1 * | 10/2003 | Lin | .............................. | 362/250 |
| 2007/0103926 A1 * | 5/2007 | Brooks et al. | ................. | 362/555 |

FOREIGN PATENT DOCUMENTS

| | | |
|---|---|---|
| CN | 101676331 | 3/2010 |
| GB | 2470350 | 11/2010 |
| JP | 2004-095853 | 3/2004 |
| JP | 2010-192415 | 9/2010 |
| JP | 2010-247370 | 11/2010 |

* cited by examiner

*Primary Examiner* — Anne Hines
(74) *Attorney, Agent, or Firm* — Hamre, Schumann, Mueller & Larson, P.C.

(57) ABSTRACT

The present invention aims to provide a light-diffusing heat shrinkable tube which has light diffusibility that enables LED point light sources to give an impression of a surface light source such as a conventional fluorescent lamp. The tube is also capable of suppressing scattering of broken fragments of a transparent pipe that includes the light sources, in the case of an unexpected accident including falling of the pipe. The present invention also aims to provide a linear LED light including the light-diffusing heat shrinkable tube. The light-diffusing heat shrinkable tube including a polyester resin and a light diffusing agent, the polyester resin having an inherent viscosity of 0.8 to 1.4 dl/g, the tube comprising 0.1 to 2.5 wt % of the light diffusing agent, the tube having a thickness of 60 to 300 μm.

5 Claims, 3 Drawing Sheets

LIGHT-DIFFUSING HEAT SHRINKABLE TUBE AND LINEAR LED LIGHT

TECHNICAL FIELD

The present invention relates to a light-diffusing heat shrinkable tube, and a linear LED light including the light-diffusing heat shrinkable tube.

BACKGROUND ART

Light emitting diodes (LEDs) have recently been attracting attention as a light. LEDs, considering their low power consumption and long lives, have a low load on the environment compared to conventional lights such as fluorescent lamps. Particularly, linear LED lights are expected to be more used in the future.

Since LEDs are a point light source, various attempts have been made to enable a transparent pipe including LED light sources to give an impression of a surface light source such as a conventional fluorescent lamp.

The attempts are, for example, incorporating a light diffusing agent into the materials (e.g. glass, resin) of lighting covers and transparent pipes, applying a light diffusing agent onto lighting covers and transparent pipes, and winding a sheet or film having a light diffusing function onto lighting covers and transparent pipes.

Patent Literature 1, for example, discloses a light transmission and diffusion filter for lighting, which contains uniformly diffused quartz glass fine particles and a light diffusing material such as titanium dioxide, silica, and calcium in a light transmitting resin. The light transmission and diffusion filter for lighting described in Patent Literature 1 greatly scatters broken fragments when broken by unexpected accident including falling of the transparent pipe, and is therefore unsatisfactory in terms of ease of handling and safety.

CITATION LIST

Patent Literature

Patent Literature 1: JP 2010-192415 A

SUMMARY OF INVENTION

Technical Problem

In view of the above current state of the art, the present invention aims to provide a light-diffusing heat shrinkable tube which has light diffusibility that enables LED point light sources to give an impression of a surface light source. The tube is also capable of suppressing scattering of broken fragments of a transparent pipe that includes the light sources, in the case of an unexpected accident including falling of the pipe. The present invention also aims to provide a linear LED light having the light-diffusing heat shrinkable tube.

Solution to Problem

The present invention directs to a light-diffusing heat shrinkable tube including a polyester resin and a light diffusing agent, the polyester resin having an inherent viscosity of 0.8 to 1.4 dl/g, the tube comprising 0.1 to 2.5 wt % of the light diffusing agent, the tube having a thickness of 60 to 300 μm.

In the light-diffusing heat shrinkable tube of the present invention, the light diffusing agent is preferably organic fine particles, and the organic fine particles preferably have a mean particle diameter of 0.5 to 20.0 μm.

The present invention is described in detail below.

The present inventors have found that a light-diffusing heat shrinkable tube has light diffusibility that enables LED point light sources to give an impression of a surface light source if the tube includes a polyester resin and a light diffusing agent and, the inherent viscosity of the polyester resin, amount of the light diffusing agent, and thickness of the tube are in the respective specific ranges. The present inventors have also found that the light-diffusing heat shrinkable tube, having favorable heat shrinkability and satisfactory strength, can cover the entire surface of a transparent pipe including light sources, and suppress scattering of broken fragments of the transparent pipe in the case of an unexpected accident including falling of the pipe. Thereby, the present invention has been completed.

The light-diffusing heat shrinkable tube of the present invention includes a polyester resin.

Examples of the polyester resin include polyester resins obtainable by condensation polymerization of a dicarboxylic acid and a diol.

Examples of the dicarboxylic acid include terephthalic acid, isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalenedicarboxylic acid, 2,7-naphthalenedicarboxylic acid, bis(benzoic acid), bis(p-carboxyphenyl)methane, anthracene dicarboxylic acid, 4,4-diphenyl ether dicarboxylic acid, 4,4-diphenoxyethane dicarboxylic acid, 5-sodium sulfoisophthalic acid, ethylene-bis-p-benzoic acid, adipic acid, sebacic acid, azelaic acid, dodecanedioic acid, 1,3-cyclohexanedicarboxylic acid, and 1,4-cyclohexanedicarboxylic acid. Each of these dicarboxylic acids may be used alone, or two or more of these may be used in combination.

Examples of the diol include diethylene glycol, ethylene glycol, 1,2-propylene glycol, 1,3-propanediol, 2,2-dimethyl-1,3-propanediol, trans- or -2,2,4,4-tetramethyl-1,3-cyclobutanediol, 1,4-butanediol, neopentyl glycol, 1,5-pentanediol, 1,6-hexanediol, 1,4-cyclohexane dimethanol, 1,3-cyclohexane dimethanol, decamethylene glycol, and cyclohexane diol. Each of these diols may be used alone, or two or more of these may be used in combination.

The polyester resin preferably contains a component derived from terephthalic acid as a dicarboxylic acid component, and a component derived from ethylene glycol as a diol component. Such a polyester resin can give heat resistance to the light-diffusing heat shrinkable tube.

The polyester resin containing a component derived from terephthalic acid as a dicarboxylic acid component, and a component derived from ethylene glycol as a diol component may include other copolymer component(s). The amount of the other copolymer component(s) in the polyester resin is preferably 10 mol % or less. An amount of more than 10 mol % may decrease the strength of the light-diffusing heat shrinkable tube, failing to sufficiently suppress scattering of broken fragments of the transparent pipe in the case of an unexpected accident including falling of the pipe.

The minimum inherent viscosity of the polyester resin is 0.8 dl/g, and the maximum is 1.4 dl/g. Setting an inherent viscosity of the polyester resin in this range enables production of a light-diffusing heat shrinkable tube which has favorable heat shrinkability and satisfactory strength.

An inherent viscosity of less than 0.8 dl/g decreases the strength of the light-diffusing heat shrinkable tube, failing to sufficiently suppress scattering of broken fragments of the transparent pipe in the case of an unexpected accident including falling of the pipe. An inherent viscosity of more than 1.4 dl/g results in a high melt viscosity of the polyester resin, unlikely to allow easy extrusion molding. The preferred minimum inherent viscosity is 1.0 dl/g, and the preferred maximum is 1.2 dl/g. The inherent viscosity refers to a value measured in orthochlorophenol at 35° C.

The preferred minimum number-average molecular weight of the polyester resin is 30000, and the preferred maximum is 55000. A number-average molecular weight of less than 30000 may decrease the strength of the light-diffusing heat shrinkable tube, while a number-average molecular weight of more than 55000 may not allow easy extrusion molding. The number-average molecular weight herein refers to a value measured by gel permeation chromatography (GPC).

For the polyester resin, each of the polyester resins having a composition described above may be used alone, or two or more of the polyester resins having a composition described above may be used in combination.

The light-diffusing heat shrinkable tube of the present invention contains a light diffusing agent.

Examples of the light diffusing agent include inorganic fine particles and organic fine particles. Examples of the inorganic fine particles include fine particles of calcium carbonate, alumina, silica, titanium oxide, zinc oxide, zirconia, barium sulfate, and glass.

Examples of the organic fine particles include fine particles of styrene resins, acrylic resins, and silicone resins. Since the high effect of suppressing scattering of broken fragments of the transparent pipe in the case of an unexpected accident including falling of the pipe, the light diffusing agent is preferably organic fine particles, more preferably fine particles of acrylic resins or silicone resins, and still more preferably fine particles of silicone resins.

Examples of the styrene resins include polystyrene, and a copolymer of styrene and a copolymerizable monomer unit. Examples of the copolymer of styrene and a copolymerizable monomer unit include styrene-acrylic acid copolymers, and styrene-methacrylic acid copolymers.

Examples of the acrylic resins include poly(meth)acrylic acid, copolymers of (meth)acrylic acid and its ester, and copolymers of (meth)acrylic acid and/or its ester and a copolymerizable monomer unit. The acrylic resin may be a crosslinked or partially crosslinked one.

Here, the term "(meth)acrylic acid" refers to methacrylic acid or acrylic acid. Examples of the ester of (meth)acrylic acid include methyl acrylate, ethyl acrylate, methyl methacrylate, and ethyl methacrylate.

The silicone resin may be any silicone resin represented by organopolysiloxanes with a siloxane bond as its skeleton.

Preferably, the organic fine particles are not melted at a melting temperature of the polyester resin, and are insoluble in a solvent. Also, the shapes of the organic fine particles are more preferred to be spherical than irregularly shaped.

The preferred minimum mean particle diameter of the organic fine particles is 0.5 µm, and the preferred maximum is 20.0 µm. A mean particle diameter of the organic fine particles in this range enables achievement of favorable dispersibility without secondary aggregation. The mean particle diameter of the fine particles can be measured with a laser diffraction particle size analyzer (Microtrac MT3000II, a product of Nikkiso Co., Ltd.).

The minimum amount of the light diffusing agent in the light-diffusing heat shrinkable tube of the present invention is 0.1 wt %, and the maximum is 2.5 wt %. An amount of the light diffusing agent in this range can increase the total luminous transmittance of the light-diffusing heat shrinkable tube, decrease the parallel luminous transmittance, and gives, to the light-diffusing heat shrinkable tube, light diffusibility that enables LED point light sources to give an impression of a surface light source.

An amount of the light diffusing agent of less than 0.1 wt % increases the parallel luminous transmittance, which leads to unsatisfactory light dispersibility. An amount of the light diffusing agent of more than 2.5 wt % decreases the total luminous transmittance. The preferred minimum amount of the light diffusing agent is 0.5 wt %, and the preferred maximum is 2.0 wt %.

The light-diffusing heat shrinkable tube of the present invention may contain known additives such as a thermostabilizer, an antistatic agent, an anti-blocking agent, a lubricant, a quencher, a nucleating agent, and a fire retardant.

The light-diffusing heat shrinkable tube of the present invention may have a single layer structure or a multilayer structure.

The minimum thickness of the light-diffusing heat shrinkable tube of the present invention is 60 µm, and the maximum is 300 µm. A thickness of the tube in this range can give moderate elasticity and strength to the light-diffusing heat shrinkable tube, and also increase the handleability.

A thickness of the tube of less than 60 µm decreases the strength of the light-diffusing heat shrinkable tube, failing to sufficiently suppress broken fragments of the transparent pipe in the case of an unexpected accident including falling of the pipe. A thickness of the tube of more than 300 µm leads to unsatisfactory brightness when the light-diffusing heat shrinkable tube covers the transparent pipe including light sources because the light-diffusing heat shrinkable tube is too thick. The preferred minimum thickness of the tube is 90 µm, and the preferred maximum is 250 µm.

Examples of the method of producing the light-diffusing heat shrinkable tube of the present invention include, but not particularly limited to, a method of mixing a polyester resin and a light diffusing agent, extrusion-molding the mixture into a tube shape to produce an original tube, and biaxially extending the tube.

The light-diffusing heat shrinkable tube of the present invention has heat shrinkability. The heat shrinkability is shown in terms of a dimensional change when a tube obtained as a result of biaxial extension is treated in boiling water for 30 seconds. The heat shrinkability is preferably 20 to 40% in the axial direction (MD direction) and 35 to 50% in the radial direction (TD direction) of the light-diffusing heat shrinkable tube. Thereby, when a transparent pipe including LED light sources, for example, is inserted into the light-diffusing heat shrinkable tube and the tube is shrunk by heat, the entire surface of the transparent pipe can be covered beautifully.

The light-diffusing heat shrinkable tube of the present invention preferably has a total luminous transmittance of 50% or higher, and a parallel luminous transmittance of 20% or lower. A total luminous transmittance of lower than 50% may not achieve satisfactory brightness in the case that a transparent pipe including light sources is covered with the light-diffusing heat shrinkable tube. A parallel luminous transmittance of higher than 20% may not allow the LED point light sources to give an impression of a surface light source.

The light-diffusing heat shrinkable tube of the present invention may be used for any application, but is preferably used for covering a transparent pipe including LED light sources.

Since the light-diffusing heat shrinkable tube of the present invention has light diffusibility for allowing LED point light sources to give an impression of a surface light source, a transparent pipe including LED light sources can give uniform illuminance over the entire pipe. Also, since the light-diffusing heat shrinkable tube of the present invention can give favorable heat shrinkability and satisfactory strength, the tube can cover the entire transparent pipe, and suppress scattering of broken fragments of the pipe in the case of an unexpected accident including falling of the pipe.

Another aspect of the present invention is a linear LED light including a transparent pipe that includes an LED light source and is covered with the light-diffusing heat shrinkable tube.

Advantageous Effects of Invention

The present invention can provide a light-diffusing heat shrinkable tube which has light diffusibility for allowing LED point light sources to give an impression of a surface light source, and which can suppress scattering of broken fragments of a transparent pipe that includes light sources in the case of an unexpected accident including falling of the pipe. The present invention can also provide a linear LED light that includes the light-diffusing heat shrinkable tube.

DESCRIPTION OF EMBODIMENTS

The present invention is described in more detail based on the following examples which, however, are not intended to limit the scope of the invention.

EXAMPLE 1

Polyethylene terephthalate (inherent viscosity: 1.10 dl/g) as a polyester resin and silicone resin fine particles (mean particle diameter: 2 µm) as a light diffusing agent were mixed at the ratio shown in Table 1 such that a resin composition was obtained. The resin composition was charged into an extruder which has a temperature adjusted to 260° C. at its charging port side and a temperature adjusted to 280° C. around its end. The resin composition was extrusion-molded into a circular tube from a 290° C. annular die. The circular tube was biaxially extended at a draw ratio of 3.0 in length and 2.5 in width at 95° C., whereby a light-diffusing heat shrinkable tube with a flat width of 55.0 mm (inner diameter: φ4.8) and a thickness of 100 µm was obtained.

EXAMPLES 2 to 11, COMPARATIVE EXAMPLES 1 to 5

A light-diffusing heat shrinkable tube was obtained in the same manner as in Example 1, except that the kinds and ratios of the polyester resin and the light diffusing agent used were changed to those shown in Table 1, and the thickness of the tube was changed to that shown in Table 1. In Example 11, the light diffusing agent used was acrylic resin fine particles (mean particle diameter: 4 µm).

(Evaluation)

The light-diffusing heat shrinkable tubes obtained in the examples and the comparative examples were evaluated for the following items.

Table 1 shows the results.

(1) Shrinkage Ratio

The obtained light-diffusing heat shrinkable tube was treated in boiling water for 30 seconds to be shrunk. The dimensional changes in the axial direction (MD direction) and radial direction (TD direction) before and after the shrinkage were determined. The shrinkage ratio was determined using the following formula.

Shrinkage ratio (%)={(size before shrinkage−size after shrinkage)/size before shrinkage}×100

(2) Tensile Strength

Figure 1:
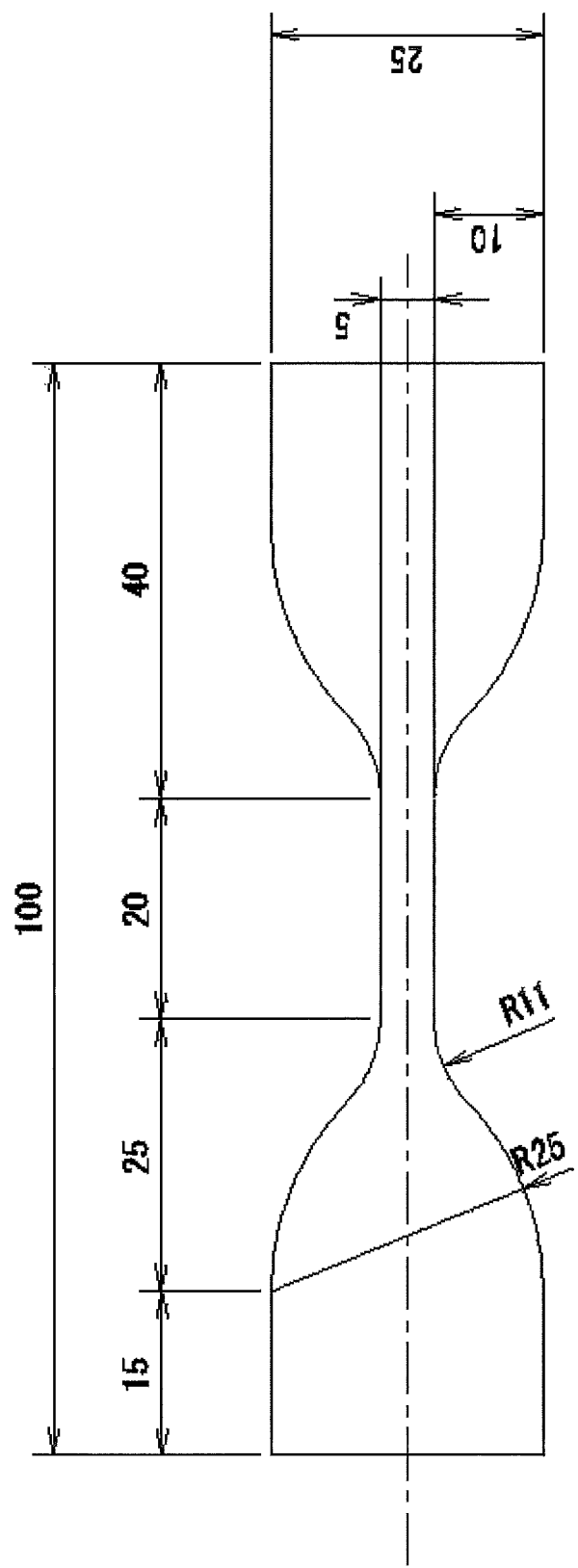
FIG. 1 is a view illustrating the shape of a measurement sample used in measurement of tensile strength.

The obtained light-diffusing heat shrinkable tube was punched out into a No. 3 dumbbell (with a shape illustrated in FIG. 1; unit of values in FIG. 1: mm), so that a measurement sample was obtained. With a tensile testing machine (V10-C, product of Toyo Seiki Seisaku-sho, Ltd.), the tensile strength was measured at a chuck distance of 70 mm and a rate of pulling of 200 mm/min. Here, the light-diffusing heat shrinkable tube used was a film obtained by cutting the tube in the axial direction (MD direction), and the tensile strength was measured in the MD direction.

(3) Total Luminous Transmittance, Parallel Luminous Transmittance

The obtained light-diffusing heat shrinkable tube was measured for the total luminous transmittance and diffused transmittance, using a haze meter (product of Toyo Seiki Seisakusho, Ltd., direct reading haze meter). The parallel luminous transmittance was determined from the following formula.

Parallel luminous transmittance (%)=total luminous Transmittance−diffused transmittance (4) Shrinkage Evaluation A fluorescence lamp (length: 1198 mm) was inserted into the light-diffusing heat shrinkable tube, and the light-diffusing heat shrinkable tube was heat-shrunk by 200° C.×30 sec heat to cover the fluorescence lamp. The covered fluorescence lamp was observed visually, and was evaluated as x if the tube was observed to have abnormal shrinkage (uneven shrinkage), and evaluated as O if the tube was observed to not have such shrinkage.

(5) Scattering Suppression Evaluation

A fluorescence lamp (length: 1198 mm) was inserted into the light-diffusing heat shrinkable tube, and the light-diffusing heat shrinkable tube was heat-shrunk by 180° C.×30 sec heat to cover the fluorescence lamp. The covered fluorescence lamp was dropped from a height of 3 m onto a concrete object with a diameter of 1.6 m. The covered fluorescence lamp was evaluated as x if the broken glass fragments of the fluorescence lamp were scattered out of the 1.6-m circle, and was evaluated as O if the broken glass fragments were not scattered out of the 1.6-m circle. Here, the diameter of the circle was determined in accordance with [(length (m) of fluorescence lamp×½)+1 (m)].

(6) Light Diffusibility Evaluation

Figure 2:
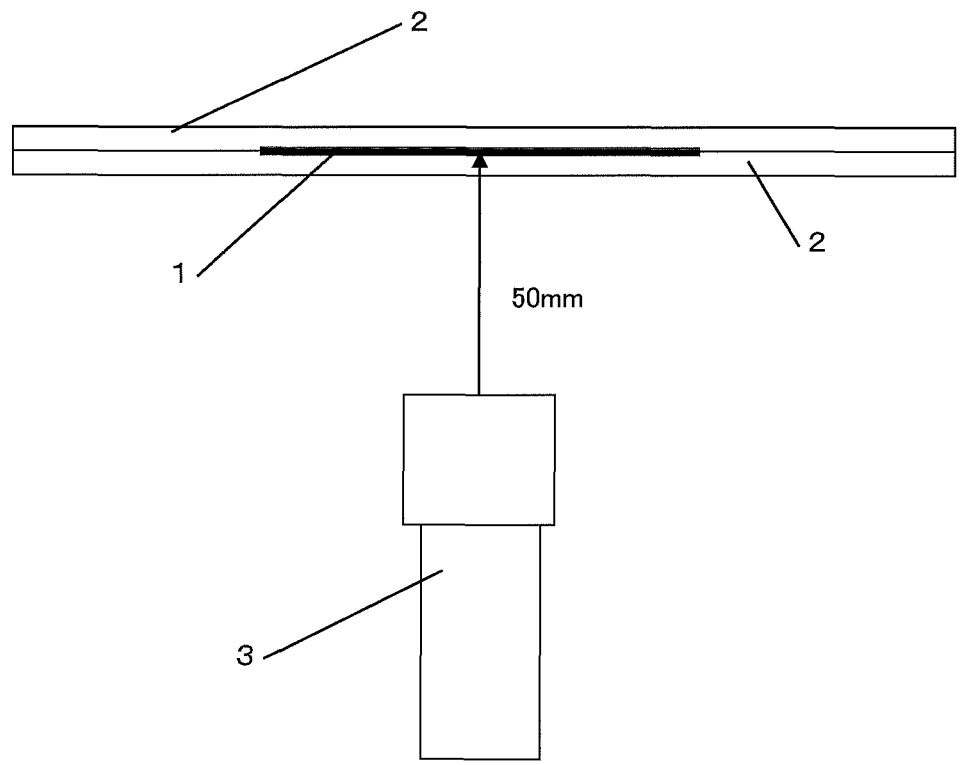
FIG. 2 is a view schematically illustrating the evaluation method in light diffusibility evaluation.
Figure 3:
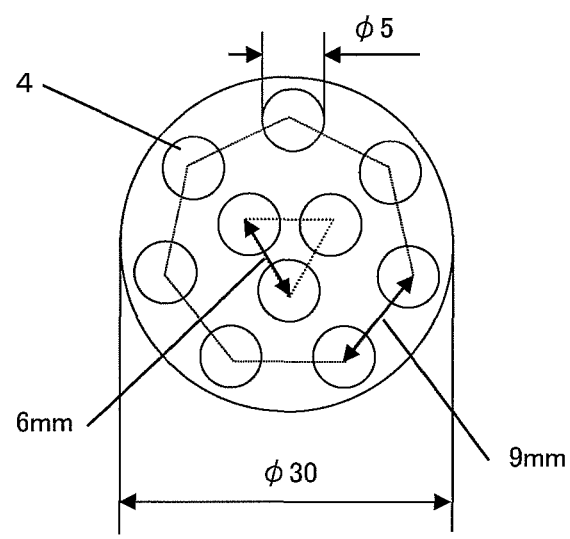
FIG. 3 is a top view schematically illustrating an LED flashlight used in the light diffusibility evaluation.

FIG. 2 schematically illustrates the evaluation method for this evaluation item. As illustrated in FIG. 2, a light-diffusing heat shrinkable tube 1 was sandwiched between two glass plates 2 (thickness: 2 mm), so that a measurement sample was produced. An LED flashlight 3 was lit from 50 mm below the measurement sample, and lighting of the LED light sources was observed from the top of the measurement sample. The LED flashlight 3 used had an illuminance of about 650 lx at a distance of 50 mm. As illustrated in FIG. 3, ten LED light sources 4 each with an outer diameter of φ5 were arranged at intervals of 6 mm to 9 mm within a φ30 circle. The LED flashlight was evaluated as x if the ten LED light sources appeared as point light sources, and was evaluated as O if the ten LED light sources appeared as a surface light source.

Here, the light-diffusing heat shrinkable tube used was a film obtained by cutting the tube in the axial direction (MD direction).

Figure 4:
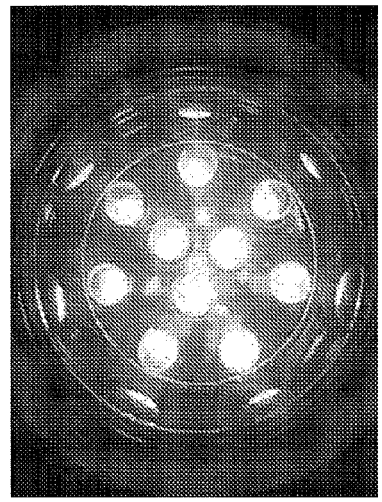
FIG. 4 is a photograph showing from the top the LED flashlight used in the light diffusibility evaluation.
Figure 5:
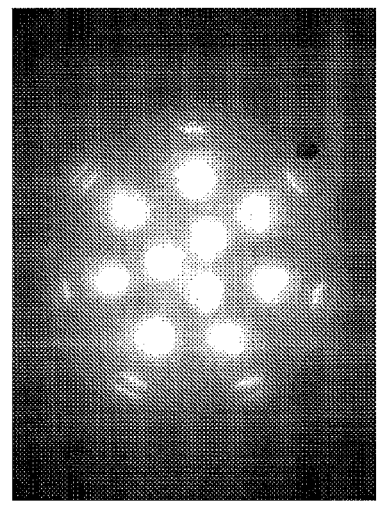
FIG. 5 is a photograph showing the LED light sources observed as point light sources in the light diffusibility evaluation.
Figure 6:
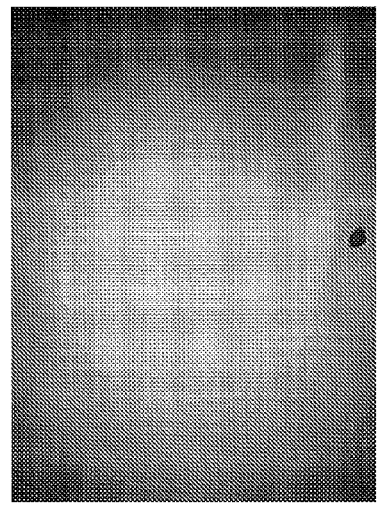
FIG. 6 is a photograph showing the LED light sources observed as a surface light source in the light diffusibility evaluation.

FIG. 4 is a photograph showing the LED flashlight from the top. FIG. 5 is a photograph showing the LED light sources which appeared as point light sources in this evaluation. FIG. 6 is a photograph showing the LED light sources which appeared as a surface light source.

TABLE 1

| | Light-diffusing heat shrinkable tube | | | | | | | |
|---|---|---|---|---|---|---|---|---|
| | Polyester resin | | Light diffusing agent | | | | Evaluation | |
| | | Inherent viscosity | Amount | | Mean particle diameter | Amount | Thickness of tube | Shrinkage ratio (%) | |
| | Kind | (dl/g) | (wt %) | Kind | (mm) | (wt %) | (μm) | MD | TD |
| Example 1 | PET | 1.1 | 99.6 | Silicone resin fine particles | 2 | 0.4 | 100 | 35 | 40 |
| Example 2 | PET | 1.1 | 99.3 | Silicone resin fine particles | 2 | 0.7 | 100 | 33 | 38 |
| Example 3 | PET | 1.1 | 99.0 | Silicone resin fine particles | 2 | 1.0 | 100 | 34 | 37 |
| Example 4 | PET | 1.1 | 98.7 | Silicone resin fine particles | 2 | 1.3 | 100 | 35 | 40 |
| Example 5 | PET | 1.1 | 98.0 | Silicone resin fine particles | 2 | 2.0 | 100 | 35 | 41 |
| Example 6 | PET | 1.1 | 99.6 | Silicone resin fine particles | 2 | 0.4 | 150 | 36 | 40 |
| Example 7 | PET | 1.1 | 99.6 | Silicone resin fine particles | 2 | 0.4 | 200 | 35 | 43 |
| Example 8 | PET | 0.8 | 99.6 | Silicone resin fine particles | 2 | 0.4 | 100 | 37 | 40 |
| Example 9 | PET | 1.4 | 99.6 | Silicone resin fine particles | 2 | 0.4 | 100 | 35 | 42 |
| Example 10 | PET | 1.1 | 99.6 | Silicone resin fine particles | 10 | 0.4 | 100 | 36 | 40 |
| Example 11 | PET | 1.1 | 99.6 | Acrylic resin fine particles | 4 | 0.4 | 150 | 35 | 41 |
| Comparative Example 1 | PET | 1.1 | 100.0 | — | — | 0.0 | 100 | 35 | 40 |
| Comparative Example 2 | PET | 1.1 | 97.4 | Silicone resin fine particles | 2 | 2.6 | 100 | 33 | 38 |
| Comparative Example 3 | PET | 1.1 | 99.95 | Silicone resin fine particles | 2 | 0.05 | 100 | 35 | 40 |
| Comparative Example 4 | PET | 0.7 | 99.6 | Silicone resin fine particles | 2 | 0.4 | 100 | 32 | 42 |
| Comparative Example 5 | PET | 1.1 | 99.6 | Silicone resin fine particles | 2 | 0.4 | 50 | 35 | 40 |

| | Evaluation | | | | | |
|---|---|---|---|---|---|---|
| | Shrinkage evaluation (200° C. × 30 sec) | Tensile strength (MPa) MD | Scattering suppression | Total luminous transmittance (%) | Parallel luminous transmittance (%) | Light diffusibility (LED × 10) |
| Example 1 | o | 230 | o | 84 | 18 | o |
| Example 2 | o | 228 | o | 75 | 9 | o |
| Example 3 | o | 238 | o | 62 | 6 | o |
| Example 4 | o | 223 | o | 61 | 5 | o |
| Example 5 | o | 218 | o | 50 | 4 | o |
| Example 6 | o | 230 | o | 75 | 13 | o |
| Example 7 | o | 228 | o | 64 | 7 | o |
| Example 8 | o | 208 | o | 84 | 20 | o |
| Example 9 | o | 248 | o | 84 | 16 | o |
| Example 10 | o | 232 | o | 84 | 20 | o |
| Example 11 | o | 220 | o | 79 | 20 | o |
| Comparative Example 1 | o | 230 | o | 88 | 58 | x |
| Comparative Example 2 | o | 228 | o | 44 | 3 | o |
| Comparative Example 3 | o | 230 | o | 85 | 50 | x |

TABLE 1-continued

| | | | | | | |
|---|---|---|---|---|---|---|
| Comparative Example 4 | o | 170 | x | 85 | 22 | x |
| Comparative Example 5 | o | 230 | x | 86 | 32 | x |

INDUSTRIAL APPLICABILITY

The present invention can provide a light-diffusing heat shrinkable tube which has light diffusibility that enables LED point light sources to give an impression of a surface light source and is capable of suppressing scattering of broken fragments of a transparent pipe that includes the light sources, in the case of an unexpected accident including falling of the pipe. The present invention also can provide a light-diffusing heat shrinkable tube including a transparent pipe with LED light sources which can achieve uniform illuminance over the entire pipe. The present invention also can provide a linear LED light having the light-diffusing heat shrinkable tube.

REFERENCE SIGNS LIST

| | |
|---|---|
| 1 | Light-diffusing heat shrinkable tube |
| 2 | Glass plate |
| 3 | LED flashlight |
| 4 | LED light source |

The invention claimed is:

1. A light-diffusing heat shrinkable tube comprising
   a polyester resin and
   a light diffusing agent,
   the polyester resin having an inherent viscosity of 0.8 to 1.4 dl/g,
   the tube comprising 0.1 to 2.5 wt % of the light diffusing agent,
   the tube having a thickness of 60 to 300 μm.

2. The light-diffusing heat shrinkable tube according to claim 1,
   wherein the light diffusing agent is organic fine particles.

3. The light-diffusing heat shrinkable tube according to claim 2,
   wherein the organic fine particles have a mean particle diameter of 0.5 to 20.0 μm.

4. The light-diffusing heat shrinkable tube according to claim 1,
   wherein the tube has a total luminous transmittance of 50% or higher, and a parallel luminous transmittance of 20% or lower.

5. A linear LED light, comprising a transparent pipe that includes an LED light source and is covered with the light-diffusing heat shrinkable tube according to claim 1.

* * * * *